(12) United States Patent
Bian

(10) Patent No.: US 11,408,534 B2
(45) Date of Patent: Aug. 9, 2022

(54) VALVE-ACTUATING DEVICE

(71) Applicant: Neoperl GmbH, Mullheim (DE)

(72) Inventor: Yichao Bian, Monheim am Rhein (DE)

(73) Assignee: Neoperl GmbH, Müllheim (DE)

( * ) Notice: Subject to any disclaimer, the term of this patent is extended or adjusted under 35 U.S.C. 154(b) by 912 days.

(21) Appl. No.: 16/074,321

(22) PCT Filed: Feb. 21, 2017

(86) PCT No.: PCT/EP2017/000242
§ 371 (c)(1),
(2) Date: Jul. 31, 2018

(87) PCT Pub. No.: WO2017/144169
PCT Pub. Date: Aug. 31, 2017

(65) Prior Publication Data
US 2021/0190231 A1    Jun. 24, 2021

(30) Foreign Application Priority Data

Feb. 22, 2016  (DE) .......................... 202016001106.6

(51) Int. Cl.
*F16K 31/385*  (2006.01)
*F16K 31/524*  (2006.01)

(52) U.S. Cl.
CPC .... *F16K 31/3855* (2013.01); *F16K 31/52408* (2013.01)

(58) Field of Classification Search
CPC ................. F16K 31/3855; F16K 31/52408
See application file for complete search history.

(56) References Cited

U.S. PATENT DOCUMENTS 1,146,723 A  *  7/1915  Losh ....................... F16K 15/18
                                                              251/83
4,361,167 A  *  11/1982  Harasewych ............ F01P 11/20
                                                              137/62

FOREIGN PATENT DOCUMENTS

| DE | 8704797 | 9/1987 |
|----|---------|--------|
| DE | 102012221043 | 5/2014 |
| DE | 102012221047 | 5/2014 |
| EP | 1548344 | 6/2005 |
| EP | 2865929 | 4/2015 |
| FR | 2481404 | 10/1981 |
| GB | 2064071 | 6/1981 |
| JP | S5497826 | 8/1979 |
| JP | S5915115 | 1/1984 |

(Continued)

*Primary Examiner* — Eric Keasel
(74) *Attorney, Agent, or Firm* — Volpe Koenig

(57) ABSTRACT

In the case of a valve-actuating device (1), it is provided that, between a manual operating element (2) and a control element (4), by which a valve (3) can be adjusted between an open position and a closed position, there is formed a compensating device (6) by which the control element (4) can be moved relative to the manual operating element (2), and toward or away from the latter, counter to a restoring force of a restoring element (9), wherein the restoring element (9) is arranged outside the compensating device (6), and/or a plunger (8) is arranged on the control element (4) and is guided in a receptacle (7) of the compensating device (6), wherein there is additionally or alternatively formed an adjusting device (34) by which the control element (4) can be moved away from or toward the manual operating element (2) (FIG. 1).

24 Claims, 9 Drawing Sheets

(56) References Cited

FOREIGN PATENT DOCUMENTS

JP           H0464783     2/1992
JP           3020501     11/1995

\* cited by examiner

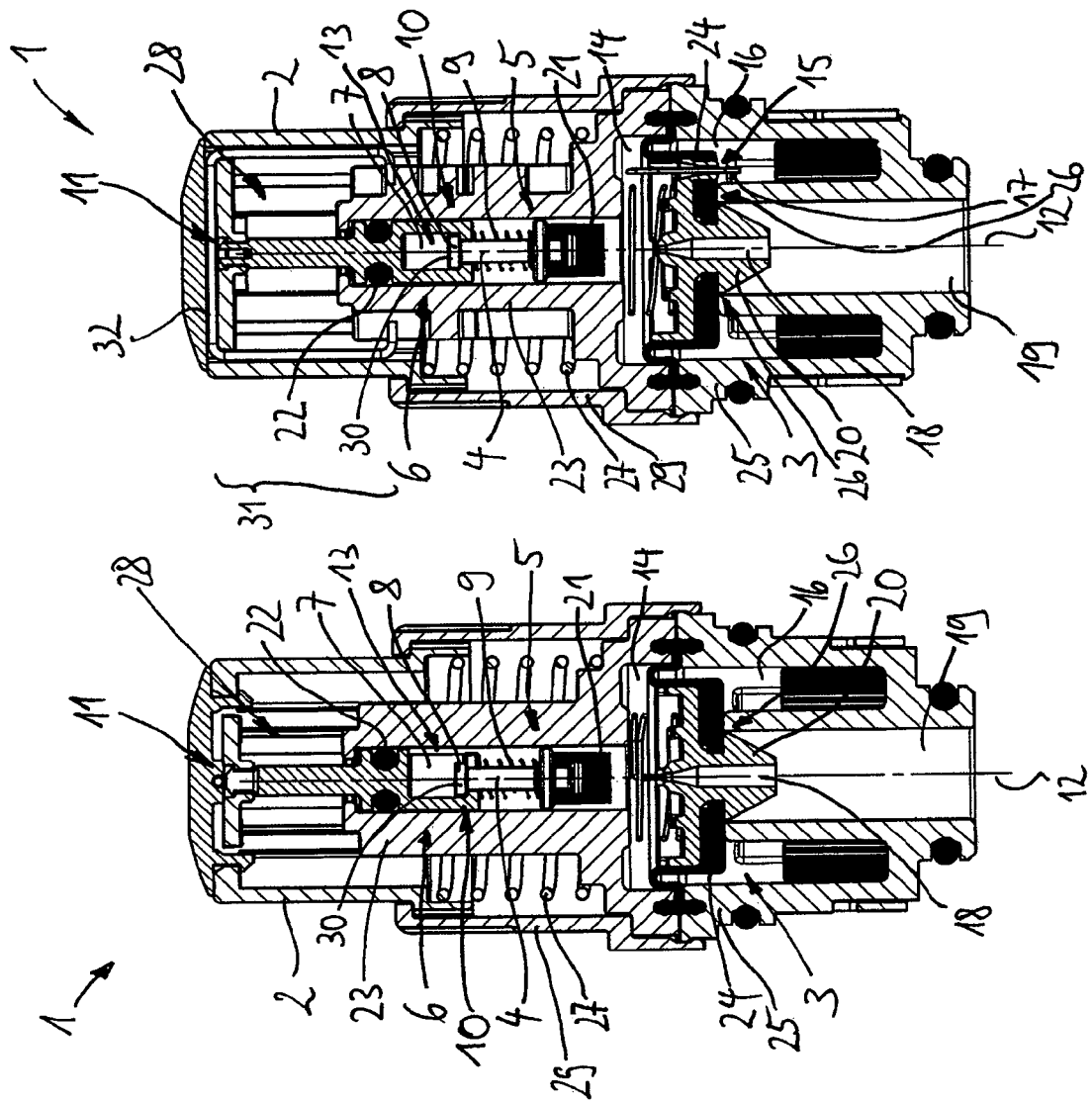

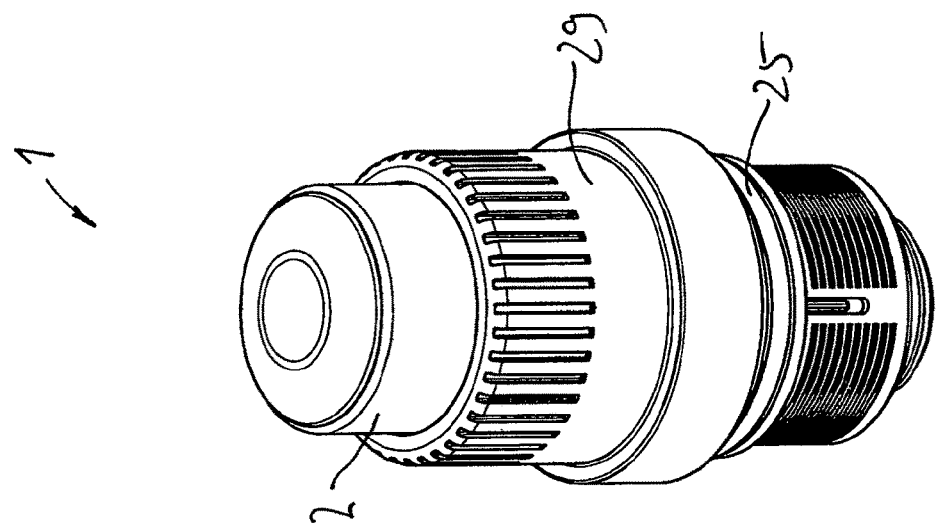
Fig. 9
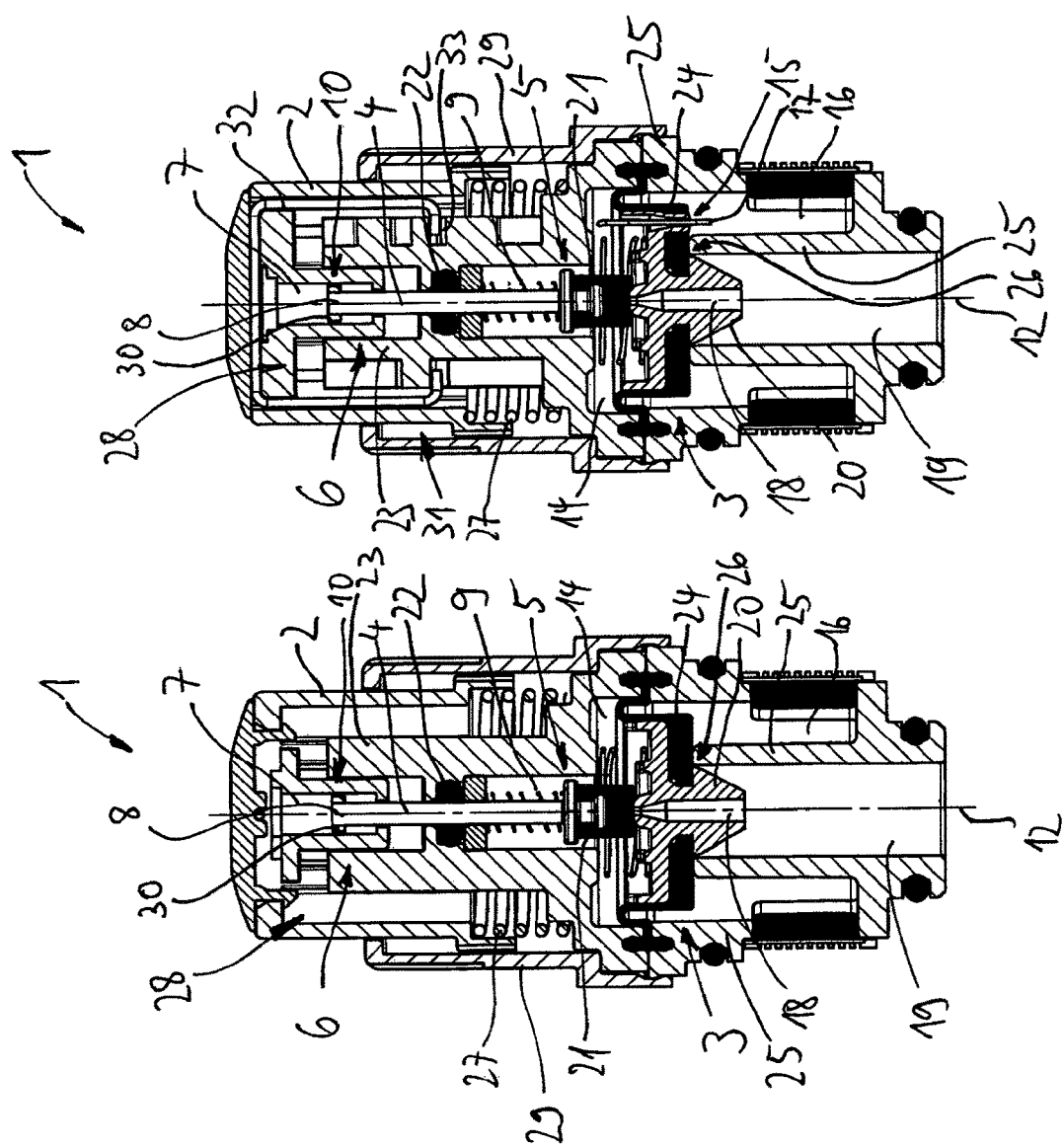
Fig. 8
Fig. 7

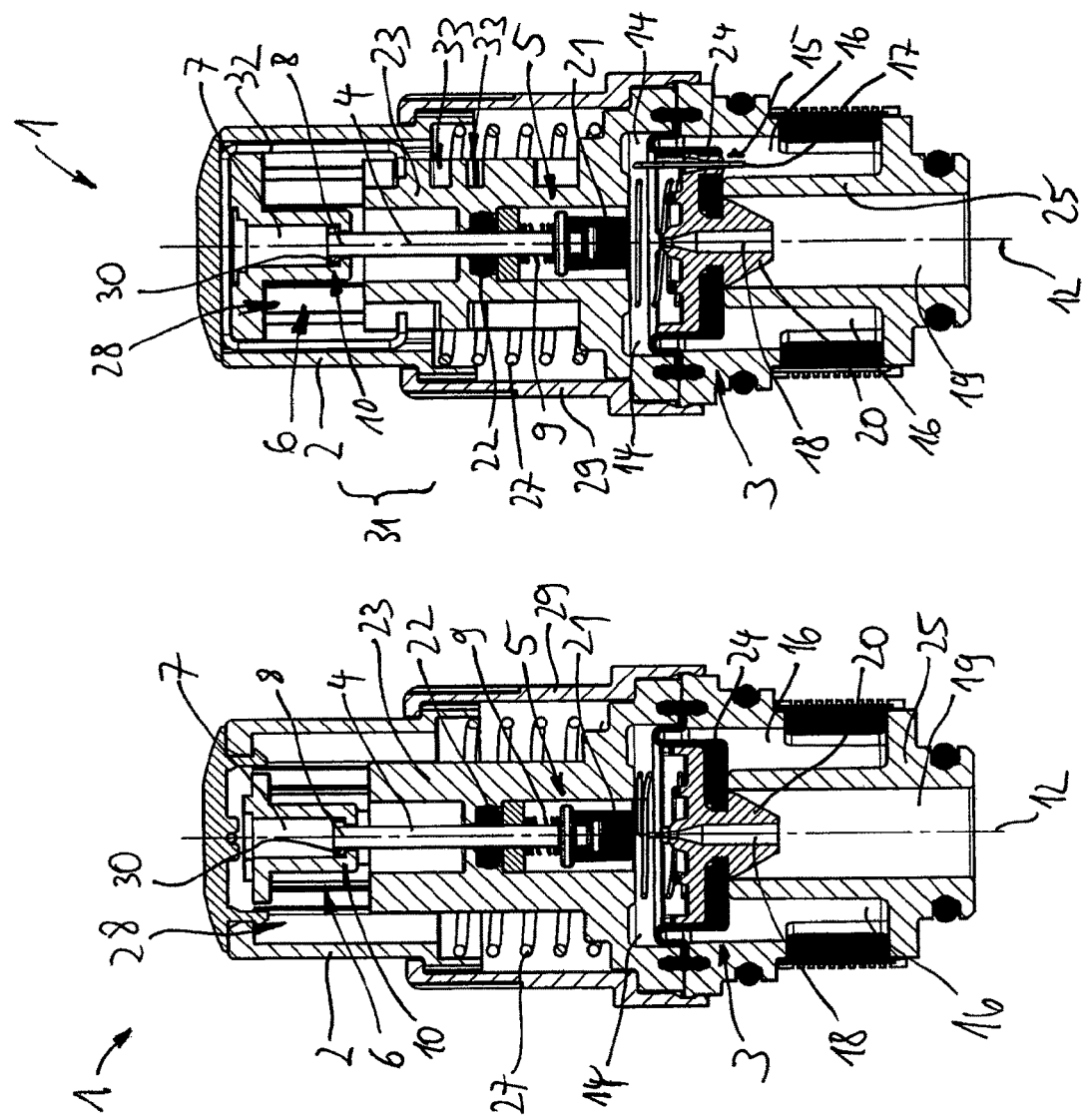

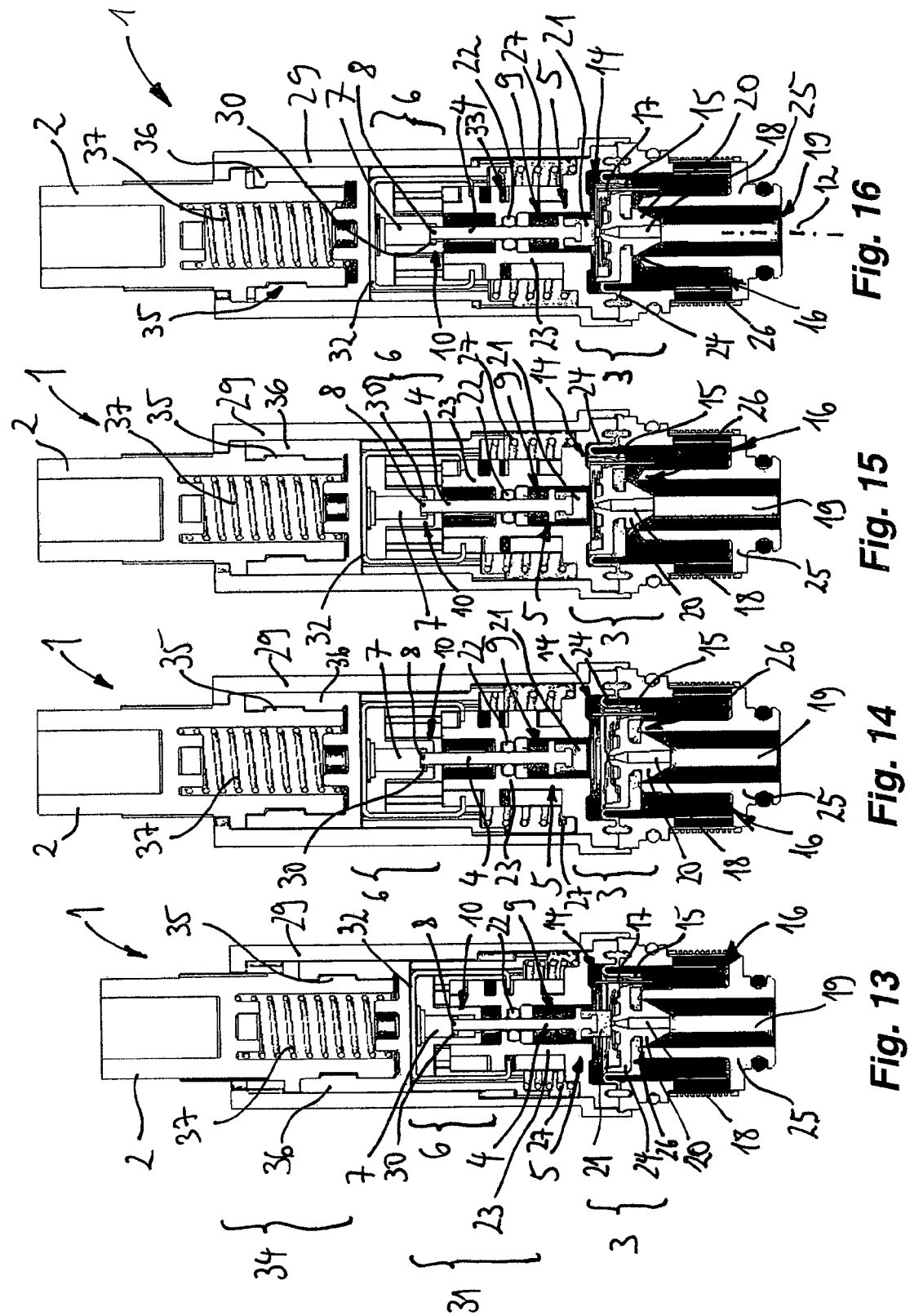

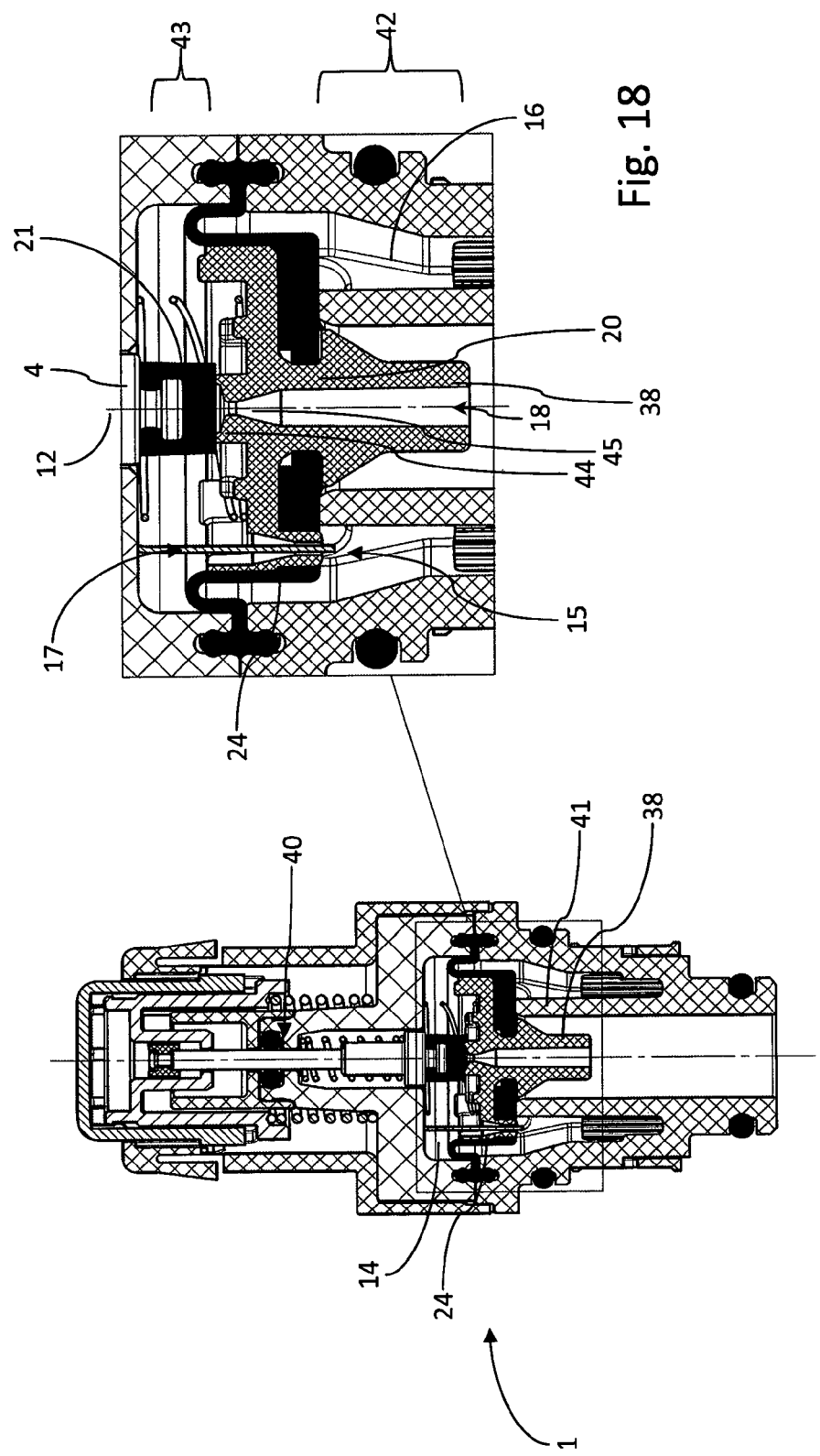

VALVE-ACTUATING DEVICE

BACKGROUND

The invention relates to a valve-actuating device, comprising a manual operating element and a valve which can be actuated by the manual operating element, wherein a control element is operatively connected to the manual operating element, wherein the valve can be actuated by a distal end of the control element, and a compensating device is arranged in operative connection between the control element and the manual operating element, which compensating device has a plunger, which is movably guided in a receptacle, and allows a relative movement of the manual operating element with respect to the control element, and wherein a restoring element is present which counters the relative movement with a restoring force.

Such valve-actuating devices are known and are used to be able to manually isolate an outlet from an inlet, and to manually connect the outlet and the inlet as required.

EP 1 548 344 B1 has disclosed a valve-actuating device with the features described in the introduction, in the case of which the plunger is formed on the manual operating element and the receptacle is formed on the control element. A restoring element is in this case arranged in the receptacle and thus in the compensating or buffer device.

SUMMARY

The invention is based on the object of providing an alternative to the solution as per EP 1 548 344 B1.

The object is achieved by a valve-actuating device with one or more features of the invention. In particular, it is thus provided, to achieve the stated object in the case of a valve-actuating device of the type described in the introduction, that the restoring element is arranged outside the compensating device. Thus, it is possible to avoid the mobility of the plunger being impeded by the restoring element in the receptacle.

Alternatively, it can also be provided, to achieve the stated object in the case of a valve-actuating device of the type described in the introduction, that the plunger is formed on a proximal end of the control element. It can thus be easily achieved that the plunger and the control element are manufactured from the same material. It can also be achieved that the receptacle and the control element can be manufactured from different materials. This is expedient because the receptacle can easily be manufacturable in a complex shape from plastic, whereas a metallic material may be better suited to the control element in order to achieve a greater load capacity and buckling resistance. It is particularly expedient if this design embodiment is combined with the above-described first design embodiment according to the invention.

In one design embodiment of the invention, provision may be made for the receptacle of the compensating device to be arranged fixedly on the manual operating element. Thus, the receptacle can be easily and reliably actuated and adjusted manually from the outside.

In one design embodiment of the invention, provision may be made for the receptacle to have a plunger extraction opening open transversely to a plunger guide direction and/or laterally. Thus, the plunger can be easily inserted during a manufacturing process.

In one design embodiment of the invention, provision may be made for the receptacle to form a stop against which the restoring element presses the plunger into an inoperative position. A defined inoperative position can thus be formed.

Alternatively, it can also be provided to achieve the stated object in the case of a valve-actuating device of the type described in the introduction, that an adjusting device is formed by which a maximum distance—for example in an open position of the valve—between a valve seat of the valve and the distal end of the control element can be adjusted. It is advantageous here that an adjustment travel that the valve, in particular a valve element, for example the valve element described further below, can perform between a closed position and an open position can be limited. Thus, intermediate positions between the closed position and the open position can be set in order that the valve is not fully opened. The maximum distance between the valve seat and the distal end of the control element may for example be adjustable by virtue of a maximum distance—for example in the case of a deployed plunger in the receptacle of the compensating device—between the manual operating element and the distal end of the control element being adjustable or adjusted by the adjusting device. For example, for this purpose, the control element may be adjustable in terms of its position independently of the manual operating element, or the manual operating element may be adjustable in terms of its position independently of the control element. Alternatively or in addition, the maximum distance between the valve seat and the distal end of the control element may be adjustable by virtue of the manual operating element being adjustable in terms of position together with the control element.

In one design embodiment of the invention, provision may be made for the adjusting device to be arranged between the compensating device and the manual operating element. A compact actuating device can thus be formed. The adjusting device can thus be easily arranged outside a sealed region of the valve. Here, it is expedient if the adjusting device is designed to adjust a distance between the compensating device and the manual operating element. Thus, a simple limitation of the adjustment travel of the valve can be achieved by virtue of an inoperative position of the plunger in the receptacle being displaced.

In one design embodiment of the invention, provision may be made for the adjusting device to have a movement thread. A conversion of a rotational operating movement into a movement that results in an adjustment of the stated maximum distance is thus possible. The manual operating element is, for this purpose, preferably mounted so as to be rotatable or pivotable, particularly preferably about an axis directed toward the valve. For an actuation of the above-mentioned closure element, the manual operating element may additionally be designed to be displaceable, in particular toward the valve. This permits easier operability, because a user can easily distinguish between a manual actuation by pushing and an adjustment of intermediate positions by rotating.

In one design embodiment of the invention, provision may be made for the adjusting device to have a supporting spring by which a deployment movement can be supported. Operability with ease of movement is thus achievable.

In one design embodiment of the invention, provision may be made for the valve to have a pressure chamber which is connected via a filling opening to an inlet of the valve and via an outlet opening to an outlet of the valve, wherein a valve element of the valve that separates the outlet from the inlet can be subjected to load by the pressure chamber and wherein the outlet opening can be opened and closed by a closure element. A servo actuator is thus formed which effects boosting of an adjusting force, input by the manual operating element, by a water pressure prevailing at the inlet. Here, the described compensating device makes it possible for the closure element to be caused to perform, or be able to perform, a follow-up movement with the valve element when the pressure is built up in the pressure chamber and the valve element is pushed into the closed position. Thus, the outlet opening can be held closed by virtue of the closure element being movable with the valve element. An actuation can thus be imparted with relatively little expenditure of force. Here, the boosting may be achievable by the pressure chamber, which is switchable by the adjusting element between a filled, pressurized, and thus closing, state and an evacuated, opening state. The closure element is preferably arranged at the distal end of the control element. Thus, additional transmission elements between the control element and the closure element can be omitted. This simplifies the structural design.

In one design embodiment of the invention, provision may be made for a pressure chamber, for example the abovementioned pressure chamber, of the valve to be sealed with respect to the manual operating element by a seat A closure of the pressure chamber to the outside can thus be easily realized. In particular, provision may be made here for the seal to bear against the control element. Thus, it is possible for the control element to enter the pressure chamber. Alternatively or in addition, provision may be made here for the seal to bear against the compensating device. Thus, an alternative introduction of an actuating movement into the pressure chamber, in particular for the adjustment of a closure element, for example of the abovementioned closure element, is possible. Here, the seal is preferably in each case moved jointly with the control element or fixed to a housing part, for example the abovementioned housing part. This permits a structurally simple design embodiment of the seal.

In one design embodiment of the invention, provision may be made for the valve element to be suspended on an elastic membrane which preferably has a filling opening, for example the abovementioned filling opening, of a pressure chamber, for example of the abovementioned pressure chamber. Thus, the filling opening is easily movable jointly with the membrane and/or with a valve element fastened thereto, which permits self-cleaning during operation, for example by a cleaning pin.

In one design embodiment of the invention, provision may be made for a pressure chamber, for example the abovementioned pressure chamber, to be delimited by a housing part, for example the abovementioned housing part, and by a membrane, for example the abovementioned membrane, secured on the housing part. A substantially two-shell pressure chamber can thus be formed which is easy to manufacture. A combination with the abovementioned seal against the manual operating element is particularly expedient here. In particular, provision may be made here for the membrane to be clamped between the housing part and a further housing part. It is thus possible to achieve that the membrane is held on the housing part in a simple and sealed manner. The further housing part preferably forms at least the outlet. Thus, the further housing part can be provided with a further function, in particular with the provision of the abovementioned valve seat.

In one design embodiment of the invention, provision may be made for an outlet opening, for example the abovementioned outlet opening, of a pressure chamber, for example of the abovementioned pressure chamber, of the valve to be arranged in an extension of the control element. Thus, a closure element, for example the abovementioned closure element, can be easily and directly driven by the control element, in particular if the latter is of bar-shaped form, in order to open and close the outlet opening.

In one design embodiment of the invention, provision may be made for an inlet, for example the abovementioned inlet, to be separated from an outlet, for example the abovementioned outlet, by an annular valve seat, for example by the abovementioned valve seat. Thus, the valve function of the valve is easily controllable. Here, the valve seat may serve as an abutment for the abovementioned valve element.

In one design embodiment of the invention, provision may be made for an outlet, for example the abovementioned outlet, to be arranged in an extension of the outlet opening. Thus, a space-saving design, in which for example the control element, the closure element and the valve element are arranged one behind the other on an imaginary line, can be achieved.

In one design embodiment of the invention, provision may be made for the restoring element to exert load on the control element. A direct introduction of the restoring force onto the control element can thus be achieved. A space-saving design can also be achieved. Here, the restoring element may for example exert tensile or pressure load. The control element is preferably subjected to pressure load by the restoring element. This permits a small structural dimension along the control element, with which support of the restoring force can be easily achieved.

In one design embodiment of the invention, provision may be made for the restoring element to be supported on a housing part, for example on the abovementioned housing part. A fixed counter support can thus be provided.

Alternatively or in addition, in one design embodiment of the invention, provision may be made for the restoring element to be supported on the manual operating element. This permits floating support, in the case of which support on a housing part is not necessary. This may be structurally advantageous, for example if the space conditions are restricted.

In one design embodiment of the invention, provision may be made for the restoring element to be a helical spring. Thus, a restoring force can be generated using a structurally simple component. A restoring force along the control element can be easily generated. The helical spring preferably accommodates the control element. Space can thus be saved.

In one design embodiment of the invention, provision may be made for the manual operating element to be subjected to load by a manual operating element restoring spring. It is advantageous here that a restoring of the manual operating element can be achieved independently of the compensating device. In particular, provision may be made here for the manual operating element restoring spring to generate a greater force than the restoring element. It can thus be easily achieved that the manual operating element restoring spring can overcome the restoring force of the restoring element. The restoring forces of the restoring element, on the one hand, and of the manual operating element restoring spring, on the other hand, are preferably oriented parallel and/or oppositely to one another. Provision is preferably made for the manual operating element restoring spring to be supported on a housing part, for example on the abovementioned housing part. A fixed counter support for the manual operating element is thus formed.

In one design embodiment of the invention, provision may be made for the manual operating element restoring spring to be formed as a helical spring. Helical springs constitute structurally simple components for generating a, for example, rectilinearly oriented restoring force. Provision is preferably made for the manual operating element restoring spring to engage around the control element and/or the compensating device. A space-saving arrangement is thus possible.

In one design embodiment of the invention, provision may be made for the manual operating element to at least partially receive or engage over the compensating device and/or the control element in a hood-like manner. A small length dimension of the device can thus be achieved.

In one design embodiment of the invention, provision may be made for the manual operating element to be adjustable beyond a stop point of the control element. The compensating device preferably permits this adjustment capability. It is advantageous here for a bi-stable adjusting mechanism, for example a push-push-type locking mechanism similar to a ballpoint pen mechanism or a cardioid curve mechanism, to be actuatable, wherein a change from one stable position into a further stable position can be achieved by an adjustment beyond the further stable position and subsequent fall-back into the further stable position. Here, the restoring element permits the required freedom of movement between the receptacle and the plunger, because the control element is not movable beyond the further stable position in which the valve closes, for example. The restoring element can thus simultaneously impart an actuating force for adjusting the valve.

In one design embodiment of the invention, provision may be made for the manual operating element to be adjustable parallel to the control element. Thus, an actuating direction and an adjusting direction coincide, and a small lateral structural dimension in relation to an actuating direction can be achieved.

In one design embodiment of the invention, provision may be made for the control element to be bar-shaped. A linear actuation can thus be realized in a simple manner in terms of construction. A lateral structural dimension can be kept small.

In one design embodiment of the invention, provision may be made for the control element to have a cross-sectional thickening at an end remote from the valve. A stop can thus be formed, by which the control element can be held in an inoperative position in a receptacle, for example the abovementioned receptacle, of the compensating unit.

In one design embodiment of the invention, provision may be made for the control element to be arranged displaceably. The control element can thus easily be guided linearly. Alternatively or in addition, provision may be made for the compensating device to be arranged displaceably, whereby the linear guidance thereof can be achieved.

In one design embodiment of the invention, provision may be made for the control element to be mounted displaceably on a housing part, for example the abovementioned housing part. This permits simple guidance of an adjustment movement of the control element. Alternatively or in addition, provision may be made for the compensating device to be mounted displaceably on a housing part, for example the abovementioned housing part. Thus, the compensating device can be guided with little outlay in terms of construction.

In one design embodiment of the invention, provision may be made for the receptacle and/or the manual operating element to be connected to a bi-stable adjusting mechanism. The valve is thus adjustable between an open position and a closed position, which are each stable positions. For example, the adjusting mechanism may be designed as a push-push-type locking mechanism, in particular as a ballpoint pen mechanism and/or as a cardioid curve mechanism. This permits a simple actuation and a simple change between the positions, because a user merely has to apply a pushing action in order to realize the change.

To achieve the stated object, provision is made according to the invention, as an alternative or in addition to that described above in the case of a valve-actuating device, in particular as described above and/or as claimed in one of the claims, for the valve-actuating device to be equipped with a manual operating element and a valve which can be actuated by the manual operating element, wherein a control element is operatively connected to the manual operating element, wherein the valve can be actuated by a distal end of the control element, and a compensating device is arranged in operative connection between the control element and the manual operating element, which compensating device has a plunger, which is movably guided in a receptacle, and allows a relative movement of the manual operating element with respect to the control element, and wherein a restoring element is present which counters the relative movement with a restoring force, wherein the valve has a pressure chamber which is connected via a filling opening to an inlet of the valve and via an outlet opening to an outlet of the valve, wherein a valve element of the valve that separates the outlet from the inlet can be subjected to load by the pressure chamber and wherein the outlet opening can be opened and closed by a closure element, characterized in that a cross-sectional area which can be covered by the closure element at the outlet opening is larger than a cross-sectional area of the control element at its outlet from the pressure chamber. It is thus possible to avoid—for example in the case of a pressure shock being transmitted into the pressure chamber—that the closure element moves of its own accord away from the outlet opening and opens up the latter in an uncontrolled manner. It is furthermore advantageous that a restoring element, for example the above-described restoring element, by which the closure element can be moved into its closed position, can be configured with a low spring force. This has the further advantage that a manual operating element restoring spring, for example the above-described manual operating element restoring spring, which forces a restoring movement of the manual operating element, likewise does not have to be dimensioned with a large spring force. In this way, switching behavior with ease of movement can be achieved.

Provision is preferably made here for the closure element to be arranged at the distal end of the control element. An actuation of the closure element—for example by the above-described manual operating element—can thus be easily performed. The cross-sectional area that can be covered may for example be at least twice as large as the cross-sectional area of the control element. For example, the cross-sectional area that can be covered may be defined by a pilot valve seat that interacts with the closure element.

In one design embodiment of the invention, provision may be made whereby, on the valve element, there is formed a pilot valve seat which can be closed and opened by the closure element, and whereby the outlet opening forms, downstream of the pilot valve seat in a flow direction, a preferably funnel-shaped constriction. It is advantageous here that the outlet opening can be formed to be as small as possible, for example with a diameter at most half as large or even at most a quarter as large as the pilot valve seat.

To achieve the stated object, provision is made according to the invention, as an alternative or in addition to that described above in the case of a valve-actuating device, in particular as described above and/or as claimed in one of the claims, for the valve-actuating device to be equipped with a manual operating element and a valve which can be actuated by the manual operating element, wherein a control element is operatively connected to the manual operating element, wherein the valve can be actuated by a distal end of the control element, wherein the valve has a pressure chamber which is connected via a filling opening to an inlet of the valve and via an outlet opening to an outlet of the valve, wherein a valve element of the valve that separates the outlet from the inlet can be subjected to load by the pressure chamber and wherein the outlet opening can be opened and closed by a closure element which is preferably arranged at the distal end of the control element, characterized in that, at the outlet opening, there is attached a pipe stub which, even when the valve is open, projects into the outlet and prevents a backflow from a main flow path of the open valve to the outlet opening. A rectifying pipe stub is thus provided which keeps the main flow remote from said pilot valve. A resistance, generated by the main flow, to a closure of the pilot valve can thus be reduced. It can thus be achieved that the pilot valve can be closed even in the presence of high pressures in the main flow path.

In one design embodiment of the invention, provision may be made for a length with which the valve element projects with the pipe stub into the outlet in the closed position of the valve to amount to at least 1.5 times, preferably at least 2 times, a stroke height of the valve element.

BRIEF DESCRIPTION OF THE DRAWINGS

The invention will now be discussed in more detail on the basis of exemplary embodiments, but is not restricted to these exemplary embodiments. Further exemplary embodiments will emerge from a combination of the features of individual or multiple patent claims with one another and/or with individual or multiple features of the exemplary embodiments.

In the figures:

FIG. 4 shows a longitudinal sectional illustration corresponding to FIG. 1, in the case of which the manual operating element is arranged in an upper inoperative position, in which the outlet opening of the valve is opened up, FIG. 5 shows a further longitudinal sectional illustration in relation to FIG. 4, in a sectional illustration rotated through 90° about the longitudinal axis, FIG. 7 shows a longitudinal sectional illustration corresponding to FIG. 1 of a further valve-actuating device according to the invention, FIG. 8 shows a further longitudinal sectional illustration corresponding to FIG. 2 of the valve-actuating device as per FIG. 7, FIG. 9 shows a three-dimensional external view of the valve-actuating device as per FIG. 7, FIG. 10 shows a longitudinal sectional illustration corresponding to FIG. 4 of the valve-actuating device as per FIG. 7, FIG. 11 shows a longitudinal sectional illustration corresponding to FIG. 5 of the valve-actuating device as per FIG. 7, with a section plane rotated through 90° in relation to FIG. 10, FIG. 13 shows a longitudinal sectional illustration of a further valve-actuating device according to the invention in a closed position of the valve, FIG. 14 shows a longitudinal sectional illustration corresponding to FIG. 13 of the valve-actuating device as per FIG. 13 in a position shortly before opening of the valve, FIG. 15 shows a longitudinal sectional illustration corresponding to FIG. 13 and FIG. 14 of the valve-actuating device as per FIG. 13 in an open position, FIG. 16 shows a longitudinal sectional illustration corresponding to FIG. 13 to FIG. 15 of the valve-actuating device as per FIG. 13 in a partially open intermediate position, FIG. 17 shows a further valve-actuating device according to the invention in an axial or longitudinal sectional illustration in a closed switching position of the valve, FIG. 18 shows a detail from FIG. 17.

DETAILED DESCRIPTION

Figure 3:
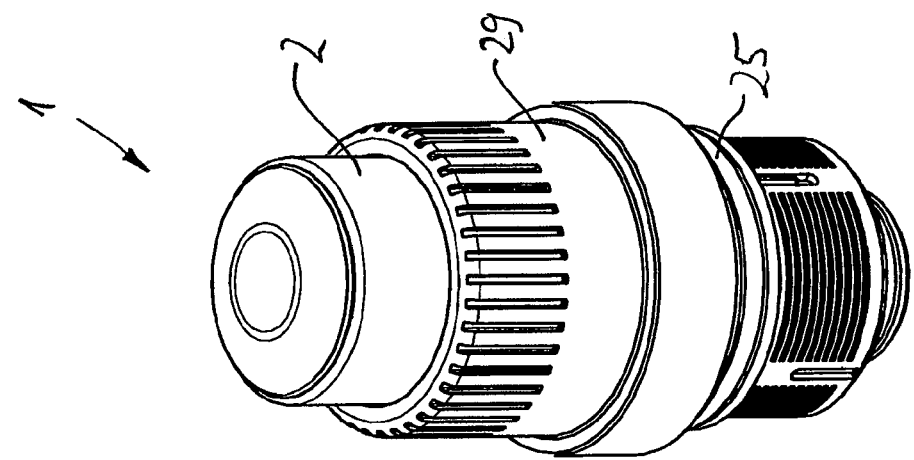
FIG. 3 shows a three-dimensional external view of the valve-actuating device as per FIG. 1.
Figure 2:
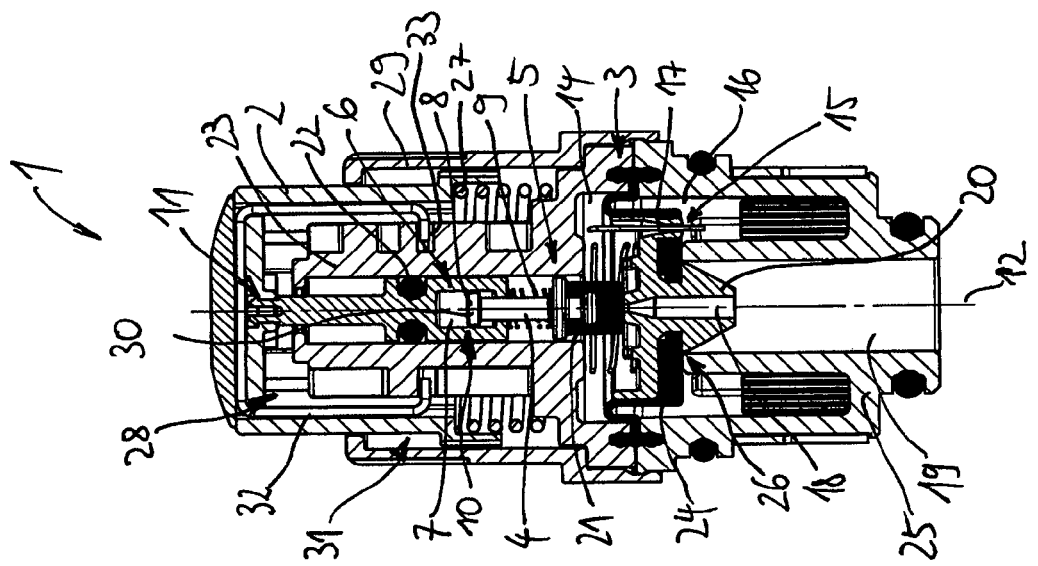
FIG. 2 shows a further longitudinal sectional illustration of the valve-actuating device as per FIG. 1 in a section plane rotated through 90° about the longitudinal axis.
Figure 1:
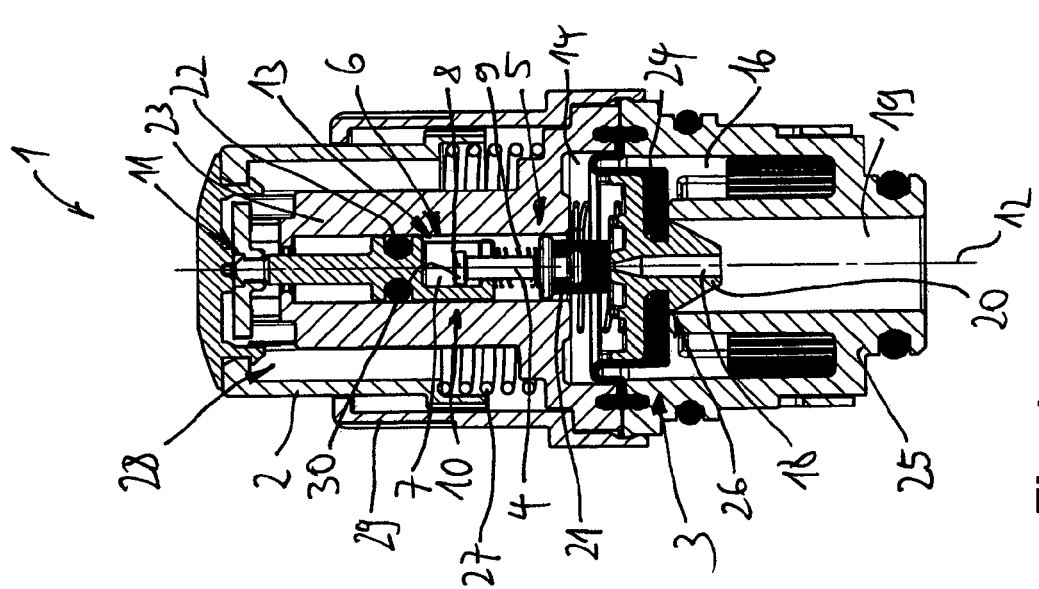
FIG. 1 shows a longitudinal section through a valve-actuating device according to the invention, wherein a manual operating element is arranged in a lower inoperative position, in which an outlet opening of a valve is closed.
Figure 6:
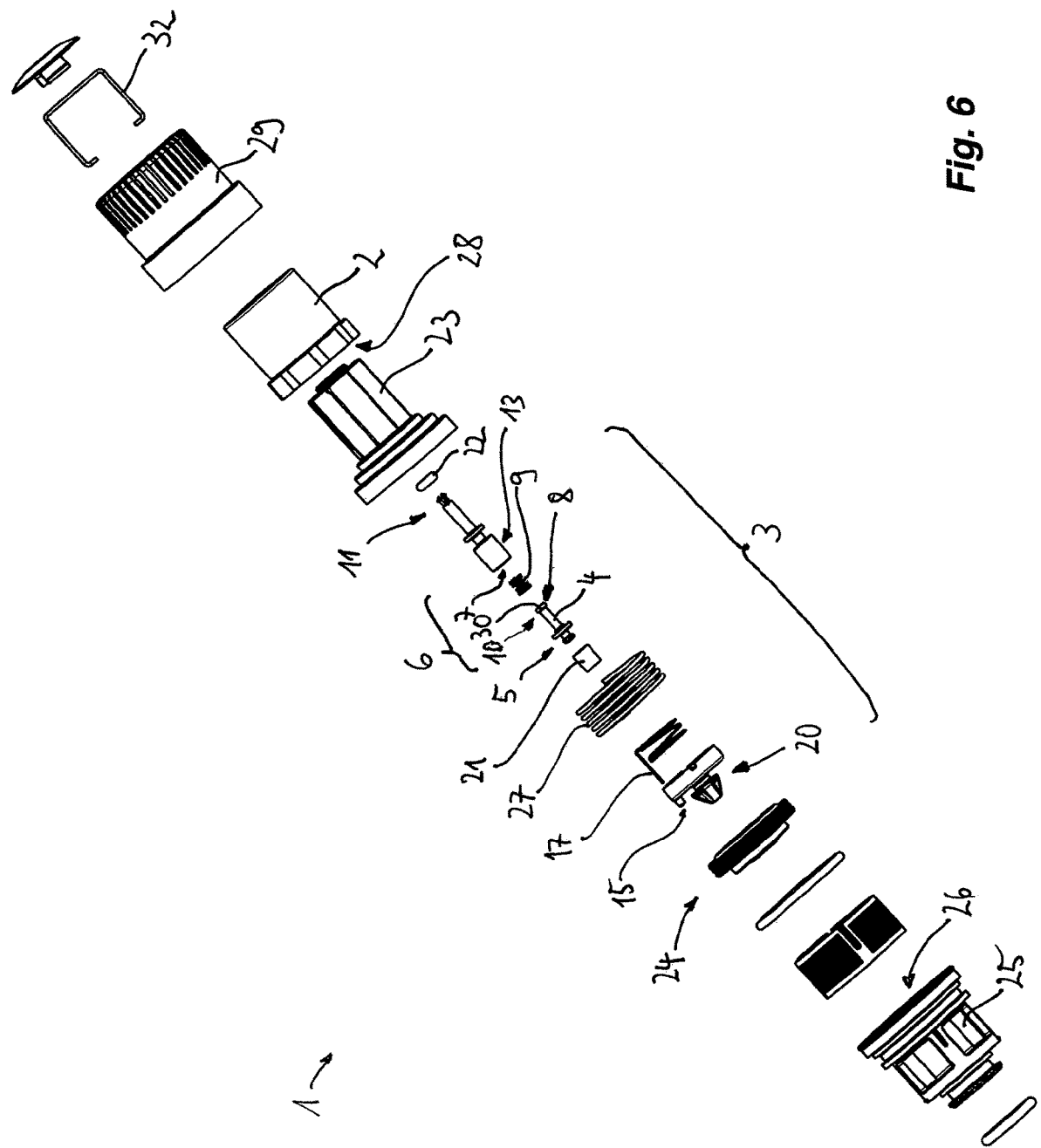
FIG. 6 shows an exploded illustration of the valve-actuating device according to the invention as per FIG. 1.
Figure 12:
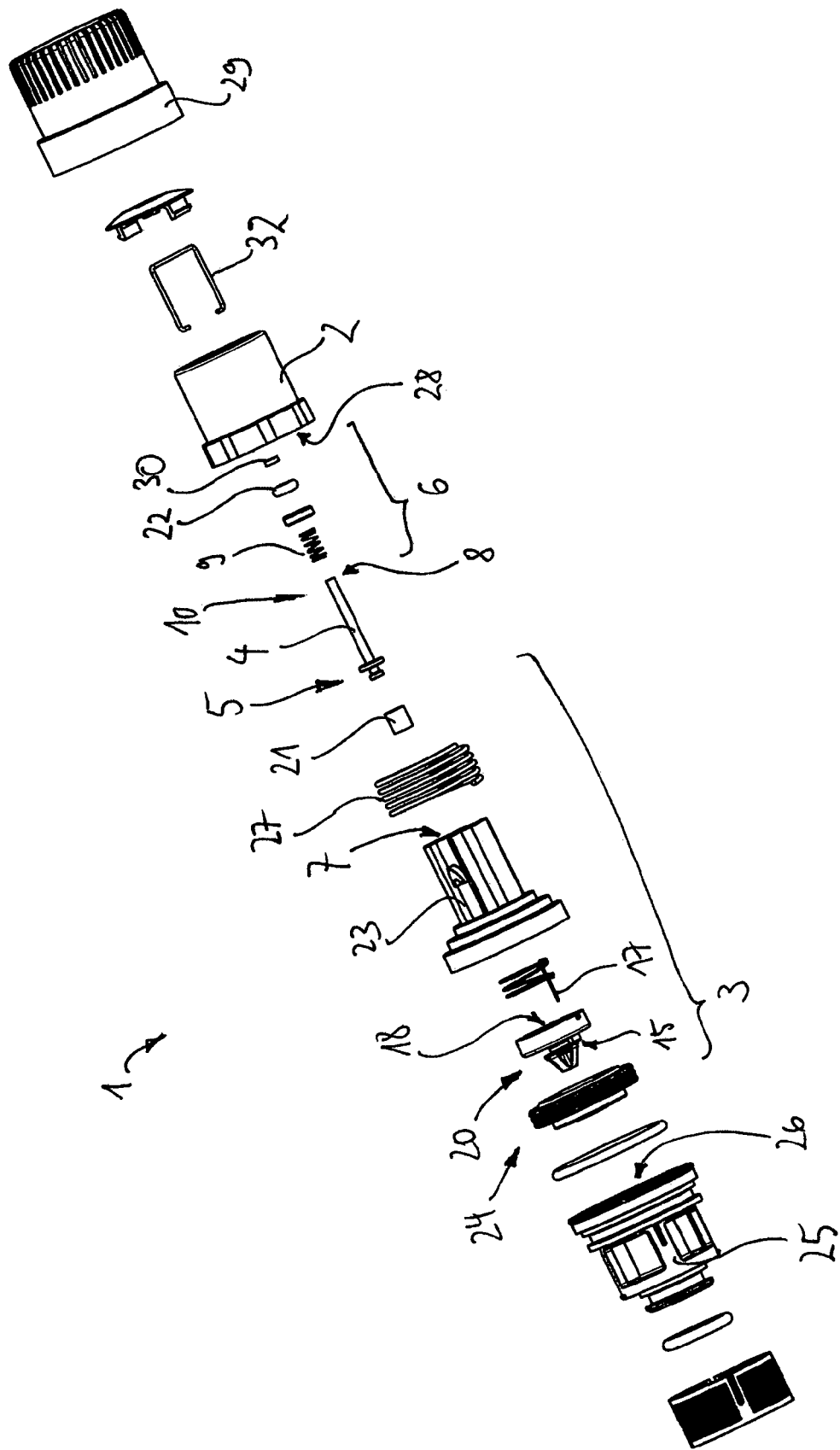
FIG. 12 shows an exploded illustration of the valve-actuating device as per FIG. 7.

FIG. 1 and FIG. 2 show a valve-actuating device 1 according to the invention in longitudinal sectional illustrations rotated through 90° in relation to one another. FIG. 3 shows the valve-actuating device 1 in a three-dimensional perspective view.

The valve-actuating device 1 has a manual operating element 2 by which a valve 3 arranged in the interior of the valve-actuating device 1 is switchable between a closed position and an open position.

Arranged between the manual operating element 2 and the valve 3 is a control element 4 which transmits an operating movement at the manual operating element 2 to the valve 3.

At a distal end 5, the control element 4 is connected to the valve 3 such that the valve 3 can be switched between the open position and the closed position by the control element 4.

Between the manual operating element 2 and the control element 4, there is formed a compensating device 6 which transmits an actuation of the manual operating element 2 to the control element 4.

For this purpose, the compensating device 6 has a receptacle 7 in which a plunger 8 is guided so as to be linearly movable in sliding fashion.

This freedom of movement has the effect that the control element 4 is movable relative to the manual operating element 2.

To hold the control element 4 in a preferred inoperative position relative to the manual operating element 2, there is formed a restoring element 9. This restoring element 9 generates a restoring force for holding the control element 4, if the position of said control element 4 permits this, in the inoperative position, shown in FIG. 4 and FIG. 5, in the receptacle 7.

From the illustrations, it can be seen that the restoring element 9 is arranged outside the compensating device 6 and in particular outside the receptacle 7. Thus, an impedance of the sliding movement of the plunger 8 in the receptacle 7 can be avoided. The plunger 8, which is guided in the receptacle 7, is formed directly on the proximal end 10 of the control element 4.

By contrast, the receptacle 7 of the compensating device 6 is fixedly connected to the manual operating element 2 by a detent connection 11.

The longitudinal axis 12 of the valve-actuating device 1 predefines a plunger guide direction, along which the plunger 8 is guided so as to be displaceable in the receptacle 7.

Transversely with respect to said plunger guide direction, the receptacle 7 is equipped with a plunger removal opening 13, through which the plunger 8 is insertable laterally on the control element 4.

This makes it possible for the plunger 8 to be formed integrally on the control element 4.

The valve 3 has a pressure chamber 14 which is connected via a filling opening 15 to an inlet 16 of the valve 3.

A cleaning pin 17 prevents the filling opening 15 from being able to become blocked.

As soon as water pressure prevails in the inlet 16, the pressure chamber 14 is thus filled via the filling opening 15.

The pressure chamber 14 is connected via an outlet opening 18 to an outlet 19 of the valve 3.

By the valve element 20, the outlet 19 can be separated from the inlet 16.

At a distal end 5, the control element 4 is connected to a closure element 21.

In the valve element 20, correspondingly to the closure element 21, there is formed the outlet opening 18 which—depending on the position of the manual operating element 2—can be closed or opened, that is to say opened up, by the closure element 21.

With the closure element 21, it is thus possible to control whether a pressure builds up in the pressure chamber 14 via the filling opening 15, which is the case when the outlet opening 18 is closed, or whether said built-up pressure dissipates again, by virtue of the outlet opening 18 being opened up by the closure element 21. For this purpose, an opening diameter of the outlet opening 18 is selected to be larger than an opening diameter of the filling opening 15.

In the presence of a built-up pressure, the valve element 20 is thus pushed against the outlet 19 in order to separate the inlet 16 from the outlet 19. When the pressure chamber 14 has been relieved of pressure (when the outlet opening 18 is open), the pressure in the inlet 16 has the effect that the valve element 20 is pushed away from the inlet 16 and opens up said inlet 16. The valve 3 is then transferred into its open position.

Here, FIGS. 4 and 5 show an intermediate position, in which the closure element 21 has already moved away from the outlet opening 18 in order to open up the latter. The pressure in the pressure chamber 14 has however not yet dissipated, such that the valve element 20 continues to close the outlet 19.

The control element 4 is arranged in the pressure chamber 14. The pressure chamber 14 is sealed off against the manual operating element 2 by a seal 22. Here, the seal 22 bears against a housing part 23 and is moved jointly with the compensating device 6.

The pressure chamber 14 is closed off by an elastic membrane 24. The membrane 24 bears the valve element 20 and the filling opening 15 formed on the valve element 20.

The abovementioned housing part 23 and the membrane 24 thus delimit the pressure chamber 14.

Here, the membrane 24 is clamped between the housing part 23 and a further housing part 25, which forms the inlet 16 and the outlet 19.

From the drawings, it is clear that the outlet opening 18 and the outlet 19 are arranged one behind the other in an extension of the control element 4 along the longitudinal axis 12, that is to say along the adjustment direction of the control element 4.

The sealing of the outlet 19 with respect to the inlet 16 by the valve element 20 is achieved by virtue of the fact that the valve element 20, in the closed position as per FIG. 1 and FIG. 2, is pressed by the pressure in the pressure chamber 14 against a valve seat 26 on the outlet 19.

The restoring element 9 is formed as a helical spring and subjects the control element 4 to pressure. Here, the restoring element 9 is supported via the receptacle 7 on the manual operating element 2.

The manual operating element 2 is subjected to load by a manual operating element restoring spring 27, which is supported on the housing part 23.

Here, the manual operating element restoring spring 27 generates a greater force than the restoring element 4.

Both the restoring element 4 and the manual operating element restoring spring 27 are formed as helical springs, which engage around and receive the control element 4.

The compensating device 6 is likewise arranged at least partially in the manual operating element restoring spring 27.

The manual operating element 2 is of hood-like form and receives, in its interior 28, the compensating device 6.

Here, the manual operating element 2 is held in a sleeve 29 which forms a stop on the manual operating element 2.

FIGS. 1 and 2 show the valve 3 in the closed position, in which the closure element 21 closes off the outlet opening 18. This closure is necessary, for the build-up of pressure in the pressure chamber 14, already when the valve element 20 has not yet arrived at the valve seat 26. At this moment, it is therefore necessary for the manual operating element 2 to already be in the lower position. To permit a follow-on movement of the valve element 20 here, a pushing action on the manual operating element 2 has the effect that, firstly, the plunger 8 moves in the receptacle 7. With the valve element 20 moving downward, the stress of the restoring element 9 has the effect that the plunger 8 moves to its stop in the receptacle 7 again.

Furthermore, the mobility of the plunger 8 in the receptacle 7 makes it possible for the manual operating element 2 to be able to be moved beyond an end, predefined by the closure element 21, of the adjustment travel for the adjusting element 4. This is advantageous in the case of a push-push-type locking mechanism because, then, a movement beyond the bottom (in relation to the pushing movement) dead center or stable point is possible in order to retract the manual operating element.

From FIG. 1, in comparison with FIG. 4, it can also be seen that the manual operating element 2 is adjustable parallel to the control element 4 along the longitudinal axis 12.

To permit an abutment against a delimitation of the receptacle 7, at the proximal end 10 of the control element 4, the plunger 8 is formed as a cross-sectional thickening 30. In the exemplary embodiment, said cross-sectional thickening 30 is integrally connected to and formed on the control element 4.

A bi-stable adjusting mechanism 31 with a clip 32 and with a control groove 33 forms a push-push-type locking mechanism, for example of a ballpoint pen mechanism or of a cardioid curve mechanism, by which the manual operating element 2 is adjustable, by a pushing action, along the longitudinal direction on the housing part 23 between an upper position (FIG. 4 and FIG. 5) and a lower position (FIG. 1 and FIG. 2).

These two adjustment positions give rise, in the described manner by the pressure build-up or the pressure dissipation in the pressure chamber 14, to the closed position (FIG. 1 and FIG. 2) and the open position (FIG. 4 and FIG. 5) of the valve 3.

FIGS. 7 to 12 show a further exemplary embodiment according to the invention of a valve-actuating device. Components or functional units which are identical or similar in terms of function and/or construction to components or functional units of the preceding exemplary embodiment are denoted by the same reference designations and will not be described separately again. The statements relating to FIGS. 1 to 6 therefore apply correspondingly to FIGS. 7 to 12.

The exemplary embodiment as per FIGS. 7 to 12 differs from the preceding exemplary embodiment in that the seal 22 is fixed in the housing part 23, such that the control element 4 is guided toward the outside by the housing part 23. The compensating device 6 is thus situated behind the seal 22 and therefore outside the pressure chamber 14. Here, the seal 22 bears against the control element 4.

The exemplary embodiment as per FIGS. 7 to 12 furthermore differs from the preceding exemplary embodiment in that the restoring element 9 is supported on the housing part 23. In order that the manual operating element 2 can transfer the control element 4 into the upper position which opens the outlet opening 18, the manual operating element restoring spring 27 is designed to be stronger than the restoring element 9.

The control element 4 is arranged displaceably on the housing part 23. FIGS. 7 and 8 again show the closed position of the valve 3, whereas FIGS. 10 and 11 show the open positions of the valve 3.

It is clear that, in FIGS. 7 and 8, the closure element 21 closes off the outlet opening 18, whereas the closure element 21 in FIGS. 10 and 11 opens up the outlet opening 18, such that the pressure chamber 14 is relieved of pressure.

FIGS. 13 to 16 show a further exemplary embodiment according to the invention of a valve-actuating device. Again, components and functional units that are similar or identical in terms of construction and/or function to components or functional units of the preceding exemplary embodiments are denoted by the same reference designations, and will not be described separately again. The statements relating to FIGS. 1 to 12 therefore apply correspondingly to FIGS. 13 to 16.

The exemplary embodiment as per FIGS. 13 to 16 firstly shows, in FIG. 13, the closed position of the valve 3, in which the closure element 21 closes off the outlet opening 18. Thus, a pressure is built up in the pressure chamber 14 via the filling opening 15 from the inlet 16, which pressure pushes the valve element 20 into the valve seat 26.

FIG. 14 shows an intermediate position in which the manual operating element 2 has already been moved into the upper position. This has been performed by a pushing action on the manual operating element 2, whereby the bi-stable adjustment mechanism 31 has been transferred into the upper position.

In this situation, the closure element 21 opens up the outlet opening 18. Since it is however still the case that pressure has been built up in the pressure chamber 14, the valve initially remains in its closed position.

The outlet opening 18 is however—as already mentioned—dimensioned to be larger than the filling opening 15, such that the pressure in the pressure chamber 14 is dissipated via the outlet opening 18 and the outlet 19.

This has the effect that the pressure in the inlet 16 lifts the membrane 24 with the valve element 20, such that the valve 3 is opened.

This state is illustrated in FIG. 15.

The exemplary embodiment as per FIGS. 13 to 16 differs from the preceding exemplary embodiments in that, additionally, between the compensating device 6 and the manual operating element 2, there is formed an adjusting device 34 by which a maximum distance, that is to say a distance in the case of a control element 4 being deployed to a maximum extent out of the receptacle 7, between the closure element 21 and the manual operating element 2 can be adjusted. In this way, the maximum distance between the valve seat 26 and the distal end 9 of the control element 4, that is to say a distance between the valve seat 26 at one side and the distal end 9, or the closure element 21 fastened thereto, at the other side, in the open position of the valve 3 is adjustable. An opening cross section at the valve seat 26 in the open position is thus variable.

This is made possible by virtue of the fact that, on the manual operating element 2, there is formed a movement thread 35 by which a rotational movement of the manual operating element 2 can be converted into a displacement movement along the longitudinal axis 12 of a sleeve-like intermediate part. The manual operating element 2 is thus, in the described exemplary embodiment, designed to be not only displaceable along the longitudinal axis 12, but additionally rotatable or pivotable about the longitudinal axis 12.

FIG. 16 shows a position of the intermediate part 36 displaced in relation to FIG. 15.

As a result of said displacement, a distance between the receptacle 7 of the compensating device 6 and the manual operating element 2 is changed.

This has the effect that, in relation to the situation in FIG. 15, the closure element 21 is moved closer to the outlet opening 18.

This leads to a brief closure of the outlet opening 18 and thus to a renewed pressure build-up in the pressure chamber 14. Since the manual operating element 2 remains in its upper position, the build-up of pressure causes the valve element 20 to be pushed not as far as the valve seat 26 but rather merely downward until the outlet opening 18 has opened again. This is because, owing to the position of the operating element 2, the closure element 21 cannot follow the valve element 20 further until it reaches the valve seat 26.

In this open state, the pressure chamber 14 is relieved of pressure again, such that the valve element 20 again seeks to move upward again. A floating equilibrium state is thus assumed, in which the inlet 16 is partially open, such that a reduced flow between inlet 16 and outlet 19 in relation to FIG. 15 takes effect. It is thus achieved that, in the open position, a reduced maximum distance between the valve seat 26 and the distal end 9 of the control element 4 in relation to FIG. 15 is assumed.

In a further exemplary embodiment, the manual operating element 2 is arranged so as to be adjustable along the longitudinal axis 12, together with the control element 4, by an adjusting device 34, for example a movement thread 35, in order to move the distal end 9 closer to the valve seat 26, or move said distal end further away from said valve seat, in the open position of the valve 3.

In FIGS. 13 to 16, a supporting spring 37 supports the deployment of the operating element 2 out of the intermediate part 36, which deployment is controlled by the movement thread 35.

Figure 19:
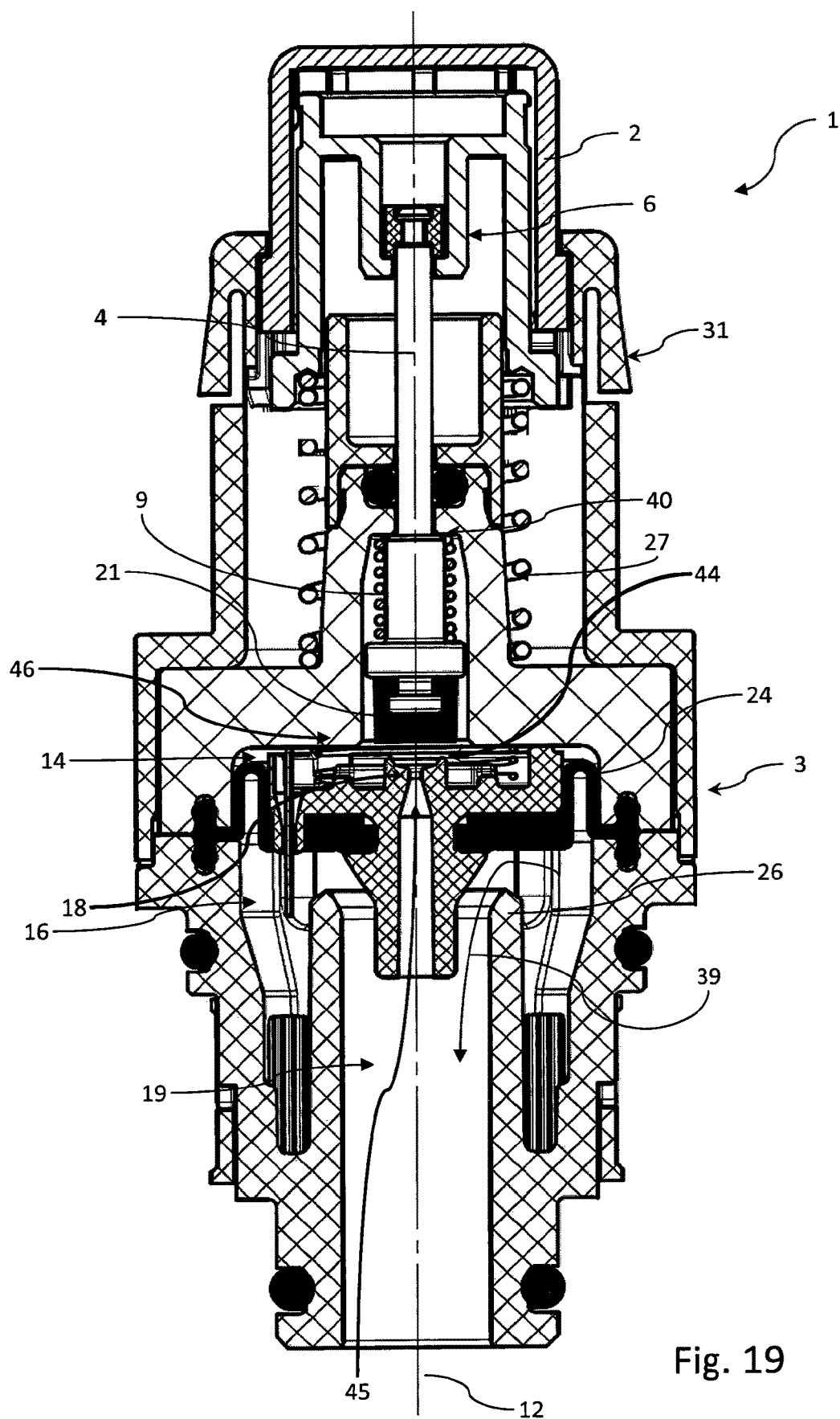
FIG. 19 shows the valve-actuating device from FIG. 17 in an open switching position of the valve.

FIGS. 17 to 19 show a further exemplary embodiment according to the invention of a valve-actuating device 1. Again, components and functional units that are similar or identical in terms of construction and/or function to components or functional units of the preceding exemplary embodiments are denoted by the same reference designations, and will not be described separately again. The statements relating to FIGS. 1 to 16 therefore apply correspondingly to FIGS. 17 to 19.

The valve-actuating device 1 differs from the preceding exemplary embodiments in that a cross-sectional area at the outlet opening 18 that can be covered by the closure element 21 is enlarged.

The cross-sectional area is in this case of such a size that the closure element 21 with the control element 4 is transferred into the closed position by an internal pressure in the pressure chamber 14.

This is achieved in that the cross-sectional area at the outlet opening 18 that can be covered by the closure element 21 is larger than a cross-sectional area of the control element 4 at its outlet out of the pressure chamber 14, that is to say in the region of a passage opening 40.

The cross-sectional area that can be covered at the outlet opening 18 is defined by a pilot valve seat 44, which can be closed off and opened up by the closure element 21 and which, with the latter, forms a pilot valve 46.

The restoring element 9 can thus be dimensioned with a low spring force. This makes it possible that the manual operating element restoring spring 27 likewise does not have to be dimensioned with a high spring force. In this way, switching behavior with ease of movement can be achieved.

Downstream of the pilot valve seat 44 in a flow direction, the outlet opening 18 describes a constriction 45, which may for example be funnel-shaped and which leads to a very small internal diameter and/or internal cross section of the outlet opening 18 at its narrowest point.

The valve-actuating device 1 as per FIGS. 17 to 19 furthermore differs from the preceding exemplary embodiments in that, at the outlet opening 18, there is attached a pipe stub 38. In all switching positions, that is to say even when the valve 3 is open, said pipe stub projects into the outlet 19 and prevents a backflow out of a main flow path 39 of the open valve 3 to or into the outlet opening 18.

The pipe stub 38 generally has an outer diameter which is smaller than, for example is at most half as large as, an internal diameter of the valve seat 26 or of the outlet 19.

This is achieved in the exemplary embodiment in that a length 42 with which the valve element 20 projects with the pipe stub 38 into the outlet 19 in the closed position of the valve 3, that is to say a length 42 between the valve seat 26 and a free end of the pipe stub 38, amounts to at least 1.5 times, preferably even at least 2 times, a stroke height 43 of the valve element 20. The stroke height 43 may in this case be defined by a dimension of the pressure chamber 14 or in some other way, for example by stops for the valve element 20.

In the case of the valve-actuating device 1, it is provided that, between a manual operating element 2 and a control element 4, by which a valve 3 can be adjusted between an open position and a closed position, there is formed a compensating device 6 by which the control element 4 can be moved relative to the manual operating element 2, and toward or away from the latter, counter to a restoring force of a restoring element 9, wherein the restoring element 9 is arranged outside the compensating device 6, and/or a plunger 8 is arranged on the control element 4 and is guided in a receptacle 7 of the compensating device 6, wherein there is additionally or alternatively formed an adjusting device 34 by which the control element 4 can be moved away from or toward the manual operating element 2.

LIST OF REFERENCE DESIGNATIONS

1 Valve-actuating device
2 Manual operating element
3 Valve
4 Control element
5 Distal end
6 Compensating device
7 Receptacle
8 Plunger
9 Restoring element
10 Proximal end
11 Detent connection
12 Longitudinal axis
13 Plunger extraction opening
14 Pressure chamber
15 Filling opening
16 Inlet
17 Cleaning pin
18 Outlet opening
19 Outlet
20 Valve element
21 Closure element
22 Seal
23 Housing part
24 Membrane
25 Further housing part
26 Valve seat
27 Manual operating element restoring spring
28 Interior of 2
29 Sleeve
30 Cross-sectional thickening
31 Bistable adjusting mechanism
32 Clip
33 Control groove
34 Adjusting device
35 Movement thread
36 Intermediate part
37 Supporting spring
38 Pipe stub
39 Main flow path
40 Passage opening
41 Valve stub
42 Length
43 Stroke height
44 Pilot valve seat
45 Constriction
46 Pilot valve

The invention claimed is:
1. A valve-actuating device (1), comprising:
a manual operating element (2);
a valve (3) which is actuatable by the manual operating element (2), the valve includes a valve element (20) and a valve seat (26);
a control element (4) operatively connected to the manual operating element (2), the valve (3) being actuatable by a distal end (5) of the control element (4);

a pilot valve (46) formed by a closure element (21) on the control element (4) and a pilot valve seat (44) around an outlet opening (18);

a compensating device (6) arranged in operative connection between the control element (4) and the manual operating element (2), said compensating device including a plunger (8), which is movably guided in a receptacle (7), and allows a relative movement of the manual operating element (2) with respect to the control element (4);

a restoring element (9) which counters the relative movement with a restoring force; and the plunger (8) is formed on a proximal end (10) of the control element (4).

2. The valve-actuating device (1) of claim 1, wherein the restoring element (9) is arranged outside the compensating device (6).

3. The valve-actuating device (1) as claimed in claim 1, wherein the receptacle (7) of the compensating device (6) is arranged fixedly on the manual operating element (2).

4. The valve-actuating device (1) as claimed in claim 1, wherein the receptacle (7) includes a plunger extraction opening (13) open at least one of transversely to a plunger guide direction or laterally, and the receptacle (7) forms a stop against which the restoring element (9) presses the plunger (8) into an inoperative position.

5. The valve-actuating device of claim 1, further comprising an adjusting device (34) by which a maximum distance between the valve seat (26) of the valve (3) and the distal end (5) of the control element (4) can be adjusted.

6. The valve-actuating device (1) as claimed in claim 5, wherein the adjusting device (34) is arranged between the compensating device (6) and the manual operating element (2), is designed to adjust a distance between the compensating device (6) and the manual operating element (2), and the adjusting device (34) has at least one of a movement thread (35) or a supporting spring (37) by which a deployment movement is supported.

7. The valve-actuating device (1) as claimed in claim 5, wherein the manual operating element (2) is arranged at least one of displaceably, or rotatably.

8. The valve-actuating device (1) as claimed in claim 5, wherein the valve (3) has a pressure chamber (14) which is connected via a filling opening (15) to an inlet (16) of the valve (3) and via an outlet opening (18) to an outlet (19) of the valve (3), a valve element (20) of the valve (3) that separates the outlet (19) from the inlet (16) is subjectable to load by the pressure chamber (14) and the outlet opening (18) is openable and closeable by a closure element (21) which is arranged at the distal end (5) of the control element (4).

9. The valve-actuating device (1) as claimed in claim 8, wherein the pressure chamber (14) of the valve (3) is sealed with respect to the manual operating element (2) by a seal (22) which bears against the control element (4), and is moveable together with the control element (4) or is secured on a housing part (23), or by the seal (22) which bears against the compensating device (6), and is moveable together with the control element (4) or is secured on the housing part (23).

10. The valve-actuating device (1) as claimed in claim 8, wherein the valve element (20) is suspended on an elastic membrane (24) which has the filling opening (15) of the pressure chamber (14).

11. The valve-actuating device (1) as claimed in claim 8, wherein the pressure chamber (14) of the valve (3) is delimited by a housing part (23) and a membrane (24) secured on the housing part (23), and the membrane (24) is clamped between the housing part (23) and a further housing part (25) forming at least the outlet (19).

12. The valve-actuating device (1) as claimed in claim 8, wherein the outlet opening (18) of the pressure chamber (14) of the valve (3) is arranged in an extension of the control element (4), or the outlet (19) is arranged in an extension of the outlet opening (18).

13. The valve-actuating device (1) as claimed in claim 8, wherein the inlet (16) is separated from the outlet (19) by the annular valve seat (26).

14. The valve-actuating device (1) as claimed in claim 5, wherein the restoring element (9) exerts a load on the control element (4).

15. The valve-actuating device (1) as claimed in claim 5, wherein the restoring element (9) is supported on at least one of a housing part (23) or on the manual operating element (2), and the restoring element (9) is a spring that receives the control element (4).

16. The valve-actuating device (1) as claimed in claim 5, wherein the manual operating element (2) is subjected to load by a manual operating element restoring spring (27), and the manual operating element restoring spring (27) generates a greater force than the restoring element (9).

17. The valve-actuating device (1) as claimed in claim 5, wherein the manual operating element (2) at least partially receives or engages over at least one of the compensating device (6) or the control element (4) in a hood-like manner.

18. The valve-actuating device (1) as claimed in claim 5, wherein the manual operating element (2) is adjustable beyond a stop point of the control element (4), and the manual operating element (2) is adjustable parallel to the control element (4).

19. The valve-actuating device (1) as claimed in claim 5, wherein the control element (4) is at least one of bar-shaped or has a cross-sectional thickening (30) at an end remote from the valve (3), and at least one of the control element (4) or the compensating device (6) is arranged displaceably on or mounted on a housing part (23).

20. The valve-actuating device (1) as claimed in claim 5, wherein at least one of the receptacle (7) or the manual operating element (2) is connected to a bi-stable adjusting mechanism (31).

21. The valve-actuating device (1) of claim 1, further comprising:

a pressure chamber (14) connected via a filling opening (15) to an inlet (16) of the valve (3) and via an outlet opening (18) to an outlet (19) of the valve (3); and a valve element (20) of the valve (3) that separates the outlet (19) from the inlet (16) is subjectable to load by the pressure chamber (14) and the outlet opening (18) is openable by a closure element (21) which arranged at the distal end (5) of the control element (4), a cross-sectional area which is coverable by the closure element (21) at the outlet opening (18) is larger than a cross-sectional area of the control element (4) at an outlet thereof from the pressure chamber (14).

22. The valve-actuating device (1) as claimed in claim 21, wherein, on the valve element (20), there is a pilot valve seat (44) which is closeable and openable by the closure element (21), and the outlet opening (18) forms, downstream of the pilot valve seat (44) in a flow direction, a constriction (45).

23. The valve-actuating device (1) of claim 2, wherein the valve (3) includes a pressure chamber (14) which is connected via a filling opening (15) to an inlet (16) of the valve (3) and via an outlet opening (18) to an outlet (19) of the valve (3);

a valve element (20) of the valve (3) that separates the outlet (19) from the inlet (16) is subjectable to a load by the pressure chamber (14) and the outlet opening (18) is openable and closeable by a closure element (21) which is arranged at the distal end (5) of the control element (4); and at the outlet opening (18), there is attached a pipe stub (38) which, even when the valve (3) is open, projects into the outlet (19) and prevents a backflow from a main flow path (39) of the open valve (3) to the outlet opening (18).

24. The valve-actuating device (1) as claimed in claim 23, wherein a length (42) with which the valve element (20) projects with the pipe stub (38) into the outlet (19) in the closed position of the valve (3) is at least 1.5 times a stroke height (43) of the valve element (20).

* * * * *